US008711522B2

(12) United States Patent
Arai

(10) Patent No.: US 8,711,522 B2
(45) Date of Patent: Apr. 29, 2014

(54) FLEXURE WITH INSULATING LAYER ISOLATING A PORTION OF A METAL SUBSTRATE

(75) Inventor: Hajime Arai, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 113 days.

(21) Appl. No.: 13/355,089

(22) Filed: Jan. 20, 2012

(65) Prior Publication Data

US 2012/0212858 A1    Aug. 23, 2012

(30) Foreign Application Priority Data

Feb. 17, 2011    (JP) .................................. 2011-031635

(51) Int. Cl.
*G11B 21/16*    (2006.01)
*G11B 5/48*    (2006.01)

(52) U.S. Cl.
USPC ................... 360/244.3; 360/245.3; 360/245.9

(58) Field of Classification Search
CPC .... G11B 5/4833; G11B 5/486; G11B 5/4846; G11B 5/4853
USPC .......... 360/244.3, 245.3, 245.8, 245.9, 264.2, 360/266.3
See application file for complete search history.

(56) References Cited

U.S. PATENT DOCUMENTS

| | | | |
|---|---|---|---|
| 6,399,899 B1 * | 6/2002 | Ohkawa et al. | 174/261 |
| 8,395,866 B1 * | 3/2013 | Schreiber et al. | 360/245.9 |
| 2005/0254175 A1 * | 11/2005 | Swanson et al. | 360/245.9 |
| 2005/0280944 A1 * | 12/2005 | Yang et al. | 360/245.9 |
| 2006/0152855 A1 * | 7/2006 | Arya et al. | 360/246 |
| 2010/0007993 A1 * | 1/2010 | Contreras et al. | 360/245.8 |
| 2010/0220414 A1 * | 9/2010 | Klarqvist et al. | 360/245.8 |
| 2010/0290160 A1 * | 11/2010 | Arai | 360/245.8 |

FOREIGN PATENT DOCUMENTS

| | | |
|---|---|---|
| JP | 2003-031915 | 1/2003 |
| JP | 2007-287280 | 11/2007 |

* cited by examiner

*Primary Examiner* — Craig A. Renner
(74) *Attorney, Agent, or Firm* — Jordan and Hamburg LLP

(57) ABSTRACT

A flexure is capable of securing strength of the flexure while surely preventing from deteriorating electric characteristic thereof. The flexure includes a metal substrate, an insulating layer formed on the metal substrate, and a wiring pattern arranged on the insulating layer and having a first end connected to the head and a second end that is provided with a terminal for external connection. The insulating layer extends a back of the terminal and a surrounding portion of the back. The metal substrate has an isolated portion that is on the back of the terminal through the insulating layer and is separated from the other portion of the metal substrate.

11 Claims, 13 Drawing Sheets

Fig.7

Z0 at Connecting Pad [Ohms]

|        | Comparative example 1 | Comparative example 2 | Comparative example 3 | First embodiment |
|--------|----|----|----|----|
| Read   | 66 | 68 | 71 | 97 |
| Write  | 40 | 41 | 56 | 52 |
| Sensor | 59 | 67 | 62 | 83 |

Fig.9

Bandwidth@-3dB [GHz]

|  | Comparative example 1 | Comparative example 2 | Comparative example 3 | First embodiment |
|---|---|---|---|---|
| Read | 8.45 | 7.70 | 8.05 | 8.45 |
| Write | 6.45 | 6.40 | 5.95 | 6.45 |
| Sensor | 5.15 | 5.15 | 5.10 | 5.40 |

(54) FLEXURE WITH INSULATING LAYER ISOLATING A PORTION OF A METAL SUBSTRATE

BACKGROUND OF THE INVENTION

1. Field of the Invention

The present invention relates to a flexure and a head suspension with the flexure to which a head is attached to read and write data on a disk in a hard disk drive.

2. Description of Related Art

A hard disk drive incorporated in an information processing unit such as a computer has a disk rotatable at high speed and a head supported on a head suspension. When the disk rotates at high speed, the head on the head suspension slightly floats from the disk to read or write date on the disk. The head suspension has the flexure to support the head.

The flexure has a metal substrate, an insulating layer formed on the metal substrate, and wirings arranged on the insulating layer. Each wiring includes first and second ends. The first end is connected to the read/write head and the second end is provided with a terminal for external connection. The terminal is connected to a terminal of a circuit board of the hard disk drive, to make a connection between the head and the circuit board through the flexure.

Japanese Unexamined Patent Application Publication No. 2003-31915 discloses a flexure with terminals each being a flying lead type. The flexure has an opening and wirings arranged on the flexure. A part of the wirings passes over the opening to form the terminals of the flying lead type. The terminal of the flying lead type is also referred to as "flying lead terminal".

Around the flying lead terminals, an insulating layer and a metal substrate of the flexure are removed by the opening. As a result, the flying lead terminals are not supported from their backs and lower strength.

On the other hand, Japanese Unexamined Patent Application Publication No. 2007-287280 (JP2007-287280) discloses a flexure with terminals each being a non-flying lead type. The terminal of the non-flying lead type is also referred to as "pad terminal".

Generally, a pad terminal is on an insulating layer that is formed on a metal substrate of a flexure. The insulating layer and the metal substrate extend over a back of the pad terminal and the surrounding area of the back to improve strength of the pad terminal.

However, the pad terminal expands relative to a corresponding wiring of the flexure to increase capacitance between the pad terminal and the metal substrate and deteriorate electric characteristic of the flexure.

To cope with this problem, JP2007-287280 forms an opening through the metal substrate on the back of the pad terminal.

However, the flexure of JP2007-287280 involves variation such as a dip of impedance at the time of signal transmission, so that it deteriorates the electric characteristic of the flexure.

SUMMARY OF THE INVENTION

An object of the present invention is to provide a flexure and a head suspension with the flexure capable of securing strength of a terminal while preventing from deteriorating electric characteristic of the flexure.

In order to accomplish the object, an aspect of the present invention provides a flexure supporting a head to read and write data. The flexure includes a metal substrate, an insulating layer formed on the metal substrate, and a wiring pattern arranged on the insulating layer and having a first end connected to the head and a second end that is provided with a terminal for external connection. The insulating layer extends over a back of the terminal and a surrounding portion of the back. The metal substrate has an isolated portion that is on the back of the terminal through the insulating layer and is separated and electrically isolated from the other portion of the metal substrate.

This aspect of the present invention secures strength of the terminal with the insulating layer and the isolated portion of the metal substrate while preventing the isolated portion from deteriorating electric characteristic of the flexure.

BRIEF DESCRIPTION OF THE DRAWINGS

FIG. 7 is a table of measured values at terminals according to the first embodiment and the comparative examples;

FIG. 9 is a table of measured values of frequencies at "−3 dB" of FIGS. 8A to 8C;

DETAILED DESCRIPTION OF EMBODIMENTS

Embodiments of the present invention will be explained in detail with reference to the drawings. Each embodiment includes an insulating layer formed on a metal substrate and extending over a back of a terminal and a surrounding portion of the back, and the metal substrate having an isolated portion that is on the back of the terminal through the insulating layer and is separated and electrically isolated from the other portion of the metal substrate. As a result, each embodiment secures strength of the terminal with the insulating layer and the isolated portion of the metal substrate while preventing the isolated portion from deteriorating electric characteristic of the flexure.

The isolated portion has a planar shape so as to cover the terminal entirely, preferably the planar shape is larger than the terminal. The isolated portion should be separated from the other portion with a gap of at least 70 µm.

A first embodiment of the present invention will be explained with reference to FIGS. 1-13.

Figure 1:
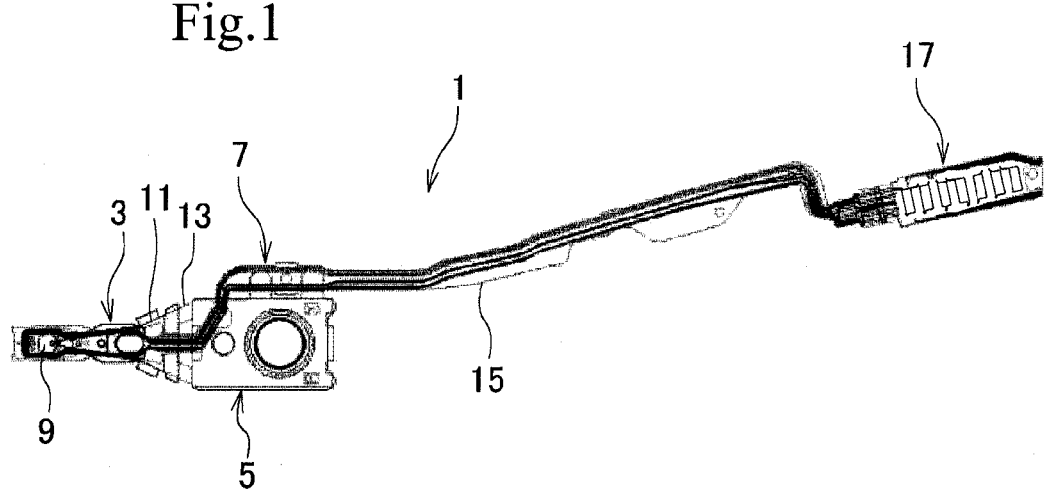
FIG. 1 is a plan view illustrating a head suspension with a flexure according to a first embodiment of the present invention.

FIG. 1 is a plan view illustrating a head suspension with a flexure according to a first embodiment of the present invention.

As illustrated in FIG. 1, a head suspension 1 has a load beam 3, a base plate 5, and a flexure 7.

The load beam 3 applies load onto a slider 9 as a head to read and write data on a disk incorporated in a hard disk drive (not illustrated). The load beam 3 includes a rigid part 11 and a resilient part 13. The rigid part 11 is made of a metal thin plate such as stainless steel thin plate having a thickness of, for example, about 100 µm.

The resilient part 13 is prepared separately from the rigid part 11 and is made of a resilient metal thin plate such as resilient stainless steel thin rolled plate having a thickness of, for example, about 40 µm. The resilient part 13 has a precision spring constant lower than that of the rigid part 11. The resilient part 13 has a first end and a second end. The first end of the resilient part 13 is fixed to a base end of the rigid part 11 by, for example, laser welding. The second end of the resilient part 13 is fixed to a front end of the base plate 5 by, for example, laser welding.

The base plate 5 is made of a metal thin plate such as stainless steel thin plate. The base plate 5 supports the rigid part 11 through the resilient part 13 of the load beam 3. The base plate 5 is attached to an arm of a carriage (not illustrated) that is turned around an axis by a voice coil motor (not illustrated).

The flexure 7 extends along the load beam 3 and is fixed and attached to the load beam 3 by, for example, laser welding. The flexure 7 supports the slider 9 at a front end thereof. A base end of the flexure 7 extends to exceed the base plate 5 and form a tail part 15.

An end of the tail part 15 is a terminal portion 17 having pad terminals 27a to 27g (to be explained later). The pad terminals 27a to 27g are connected to terminals of a circuit board (not illustrated) of the hard disk drive by, for example, conductive adhesive, soldering or the like, to make a connection between the slider 9 and the circuit board through the flexure 7.

Figure 2:
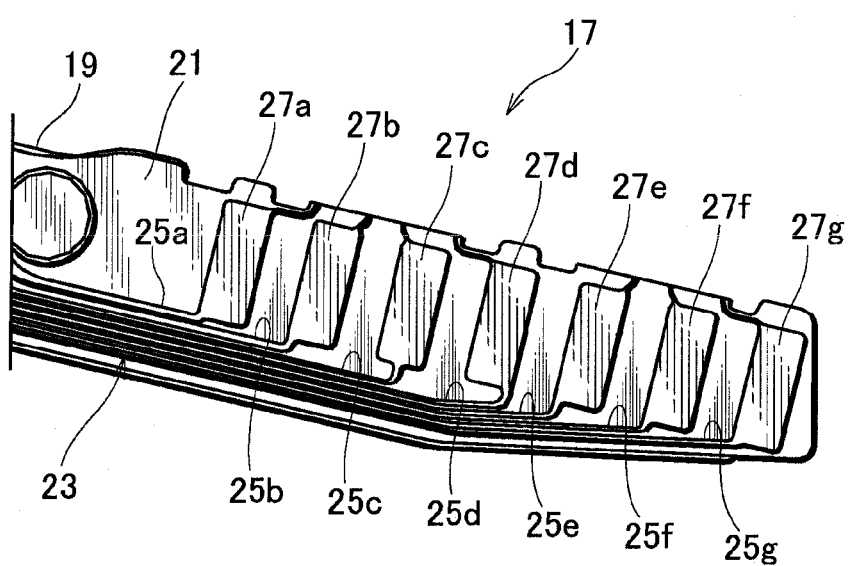
FIG. 2 is a plan view illustrating a terminal portion of the flexure of FIG. 1.

The flexure will be explained in more detail with reference to FIGS. 2 to 4. FIG. 2 is a plan view illustrating the terminal portion of the flexure of FIG. 1, FIG. 3 is a bottom plan view of the same, and FIG. 4 is a sectional view taken along a line IV-IV of FIG. 3.

Figure 3:
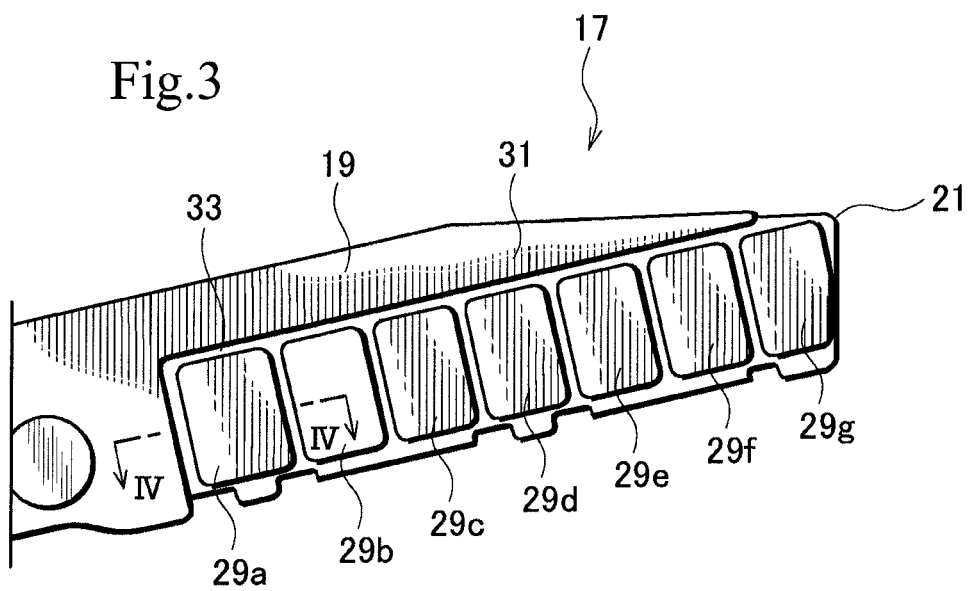
FIG. 3 is a bottom plan view illustrating a terminal portion of the flexure of FIG. 1.
Figure 4:
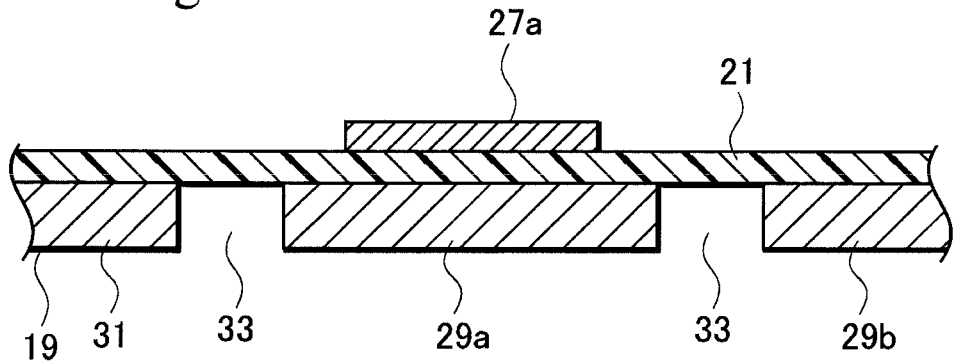
FIG. 4 is a sectional view taken along a line IV-IV of FIG. 3.

As illustrated in FIGS. 2-4, the flexure 7 has a metal substrate 19, an insulating layer 21 formed on the metal substrate 19, and a wiring pattern 23 arranged on the insulating layer 21.

The metal substrate 19 is made of a resilient conductive metal thin plate such as stainless steel thin rolled plate (SST) having a thickness in a range of, for example, about 12 to 20 µm in a layer direction or a thickness direction of the flexure 7.

The insulating layer 21 is made of flexible insulating resin such as polyimide and has a thickness in a range of, for example, about 5 to 15 µm in the layer direction of the flexure 7.

The wiring pattern 23 is made of conductive metal such as copper and has a thickness in a range of, for example, about 8 to 15 µm in the layer direction of the flexure 7. The wiring pattern 23 is covered with a cover insulating layer (not illustrated) made of resin such as polyimide.

The wiring pattern 23 includes plural wirings or traces 25a to 25g for reading and writing data on the disk, i.e., signal transmission, for a heater to vertically adjust the slider 9 to the disk, for a sensor to detect a hit of the slider 9 to the disk, and the like.

The traces 25a to 25g of the wiring pattern 23 extend from first ends on the front ends of the flexure 7 to second ends on the base end of the flexure 7. The first ends of the traces 25a to 25g are connected to the slider 9, and the second ends of the same are provided with pad terminals 27a to 27g (hereinafter simply referred to as "terminals 27a to 27g") on the terminal portion 17 for external connection, respectively.

In this way, the wiring pattern 23 includes the first end connected to the slider 9 and the second end that is provided with terminals 27a to 27g for external connection.

Each of the terminals 27a to 27g has a same rectangular shape wider than the corresponding trace of the wiring pattern 23. The terminals 27a to 27g are arranged side by side so that the terminals 27a to 27g are parallel to each other and longitudinal directions thereof align with a lateral direction crossing a longitudinal direction of the flexure 7. Adjacent terminals are separated from each other with a predetermined gap.

Each terminal has a surface that is exposed on the outside of the cover insulating layer through an opening (not illustrated), to electrically connect the terminal of the flexure to the terminal of the circuit board of the hard disk drive with the conductive material. The opening is formed by partly removing the cover insulating layer.

The backs of the terminals 27a to 27g are supported by the insulating layer 21 and isolated portions 29a to 29g of the metal substrate 19, respectively. The back or back side of each terminal is opposite to the surface in the layer direction of the thickness direction of the flexure 7. The insulating layer 21 includes a portion disposed on the back of each terminal and continuously extending over the back and the surrounding portion of the back.

Namely, the insulating layer 21 has no opening or hole necessary for a flying lead terminal in the portion affecting strength of the terminal, so that it surely supports the terminals 27a to 27g. According to the embodiment, the insulating layer 21 in the whole terminal portion 17 is a single plate having no opening or hole.

As illustrated in FIGS. 3 and 4, the isolated portions 29a to 29g are segments of the metal substrate 19 each disposed on the back of the corresponding terminal, i.e., each isolated portion is aligned with the corresponding terminal.

Each isolated portion is separated from adjacent isolated portions and a substrate body 31 of the metal substrate 19 as the other portion with a groove 33. The groove 33 is formed by removing or etching the metal substrate 19 and exposes the insulating layer 21 to the outside of the metal substrate 19. The groove 33 has a width of at least 70 µm.

Therefore, each isolated portion is electrically isolated from adjacent isolated portions and the substrate body 31 as the other portion with a gap (groove 33) of at least 70 µm. The groove 33 having a width of about 70 µm is sufficient for the gap to electrically isolate the isolated portions 29a to 29g. However, the width of the groove 33 may be set greater than 70 µm or the groove 33 may be filled with an insulating material to further ensure electric isolation.

According to the embodiment, each isolated portion has the same rectangular planar shape larger than the corresponding terminal, to support the back and the surrounding portion of the corresponding terminal through the insulating layer 21.

Namely, the insolated portions 29a to 29g together with the insulating layer 21 improve strength of the terminals 27a to 27g.

Since the isolated portions 29a to 29g are electrically isolated from each other and from the substrate body 31 of the metal substrate 19, it prevents the isolated portions 29a to 29g from generating or increasing capacitance with respect to the terminals 27a to 27g.

As a result, the flexure 7 suppresses variation such as a dip or a partial depression of impedance at the terminals 27a to 27g at the time of the signal transmission.

A test result of the signal transmission will be explained with reference to FIGS. 5A to 9. As the test, impedance and SDD21 (differential signal transmission characteristic) are measured on the flexure 7 according to the first embodiment and flexures 7a to 7c according to comparative examples 1 to 3.

Figure 5A:
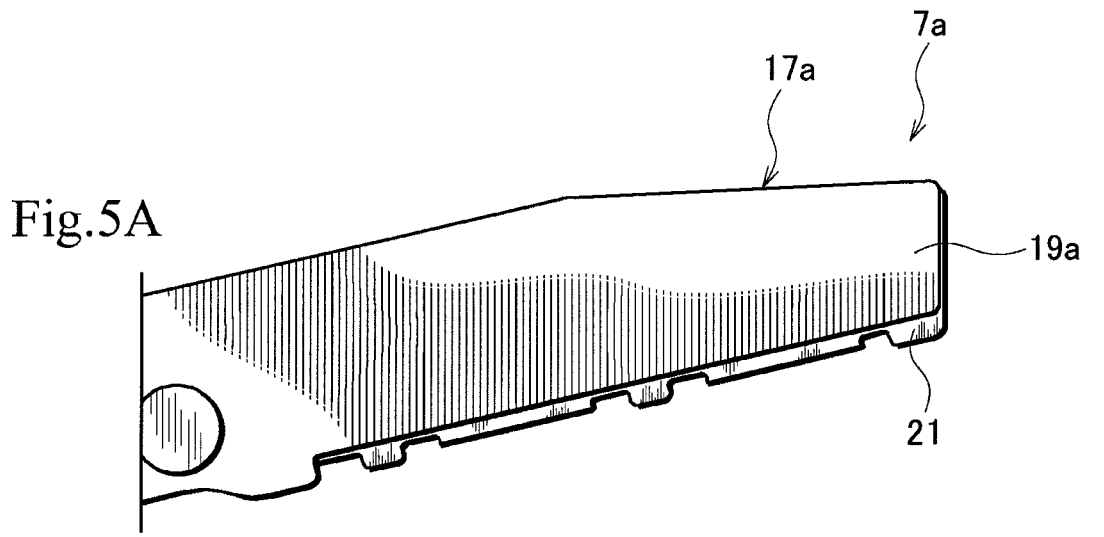
FIGS. 5A to 5C are bottom plan views illustrating terminal portions according to comparative examples 1 to 3, respectively.
Figure 5B:
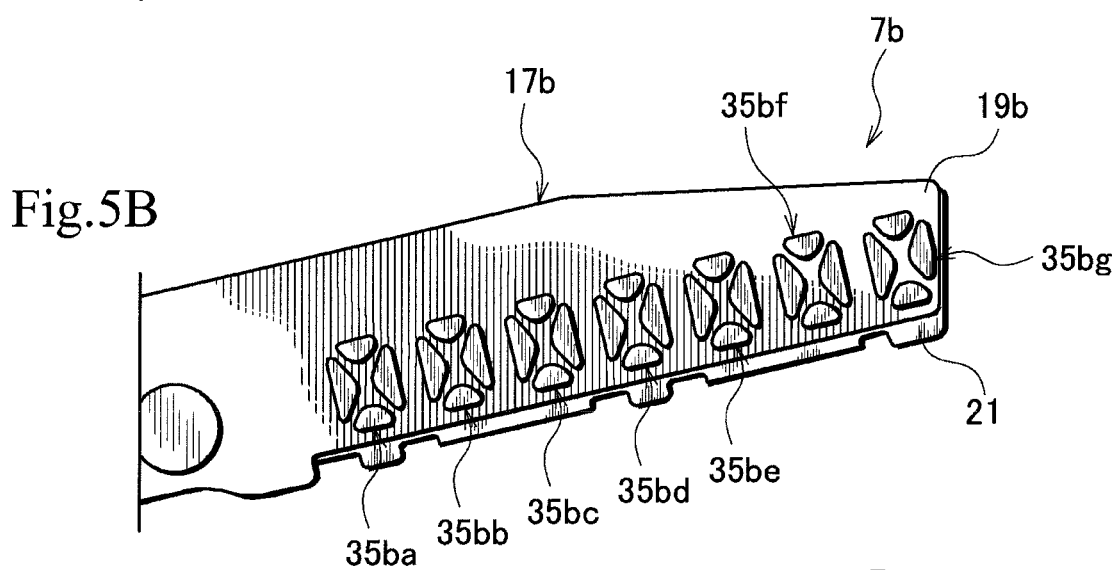
Figure 5C:
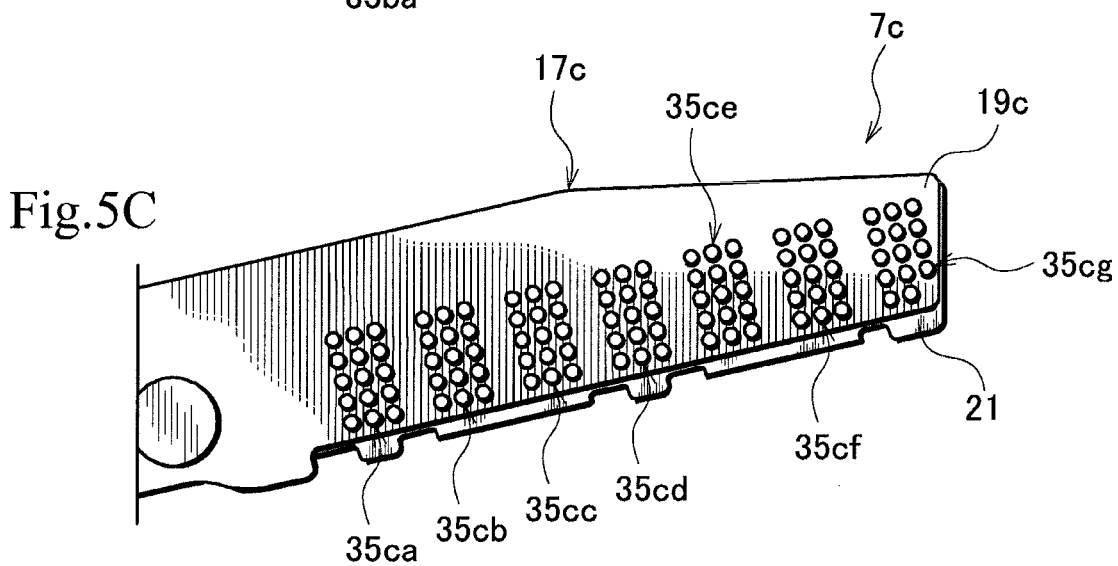

The flexures 7a to 7c have configurations illustrated in FIGS. 5A to 5C. FIGS. 5A to 5C are bottom plan views illustrating terminal portions according to the comparative examples 1 to 3, respectively.

The flexures 7a to 7c include terminal portions 17a to 17c that differ from the terminal portion 17 of the first embodiment in the lack of the isolated portions 29a to 29g. Namely, the terminal portions 17a to 17c have metal substrates 19a to 19c different from the metal substrate 19 as well as the terminals 27a to 27g (not illustrated) and the insulating layer 21 that are the same as the first embodiment, respectively.

The metal substrates 19a to 19c of the terminal portions 17a to 17c have no opening or hole necessary for a flying lead terminal. The metal substrate 19a of the comparative example 1 is a simple plate. The metal substrate 19b of the comparative example 2 has groups 35ba to 35bg of pores. Each group is formed through a portion of the metal substrate 19b corresponding to a terminal. Similarly, the metal substrate 19c of the comparative example 3 has groups 35ca to 35cg of pores.

Figure 6A:
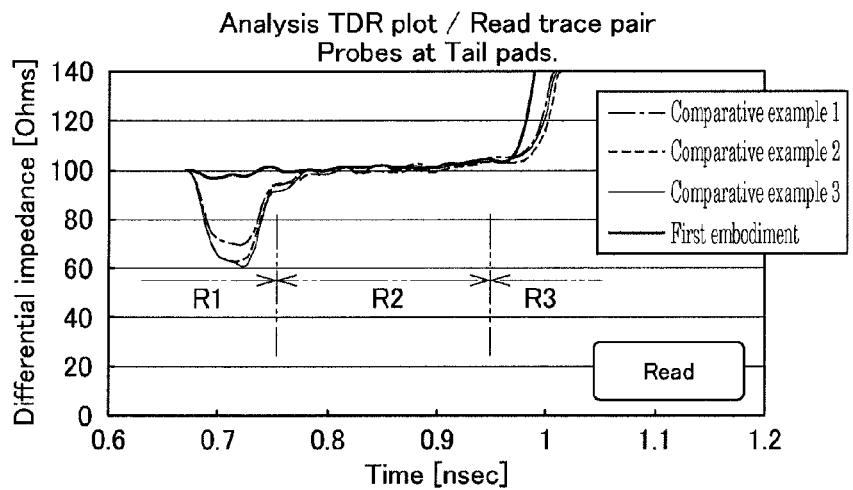
FIGS. 6A to 6C are graphs illustrating impedance changes of wiring patterns according to the first embodiment and the comparative examples.
Figure 6B:
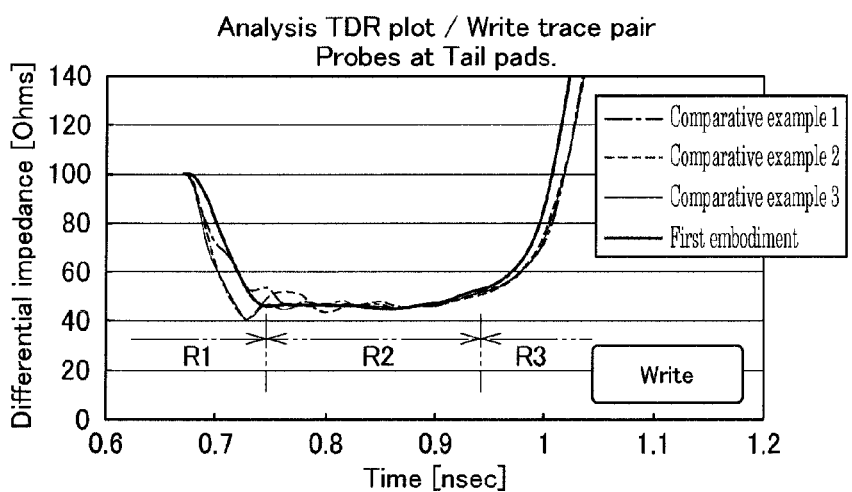
Figure 6C:
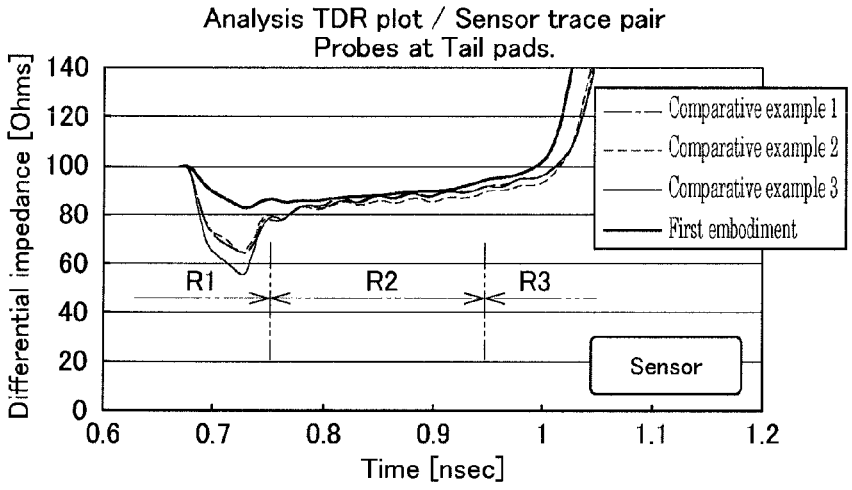

FIGS. 6A to 6C are graphs illustrating impedance changes of wiring patterns according to the first embodiment and comparative examples in which FIGS. 6A, 6B and 6C are based on measured values of reading traces, writing traces and sensor traces, respectively. FIG. 7 is a table of measured values at terminals according to the first embodiment and comparative examples.

In FIGS. 6A to 6C, an ordinate indicates impedance (Ω) and an abscissa indicates time (nsec). A left region R1 of FIGS. 6A to 6C corresponds to terminals of a flexure, a central region R2 corresponds to a part of a wiring pattern extending from a tail part to a resilient part of a load beam, and a right region R3 corresponds to another part of a wiring pattern extending from the resilient part to a slider. In FIG. 7, "Read", "Write" and "Sensor" correspond to reading traces, writing traces and sensor traces, respectively.

As is apparent from FIGS. 6A to 7, the impedance changes of the comparative examples 1 to 3 exhibit a dip or partial depression at the terminals 27a to 27g. In contrast, the impedance change of the first embodiment smoothly transitions into the tail part 15 from the terminals 27a to 27g without such dip or partial depression.

The impedance changes in FIG. 6B are slightly different from those in FIGS. 6A and 6C. In FIG. 6B, impedance changes of the comparative examples 1 and 2 each have a small dip relative to the other traces in FIGS. 6A and 6C at the terminals 27a to 27g. The impedance change of the comparative example 3 raises at the terminals 27a to 27g. In contrast, the impedance change of the first embodiment smoothly transitions into the tail part 15 without such small dip and raise.

Figure 8A:
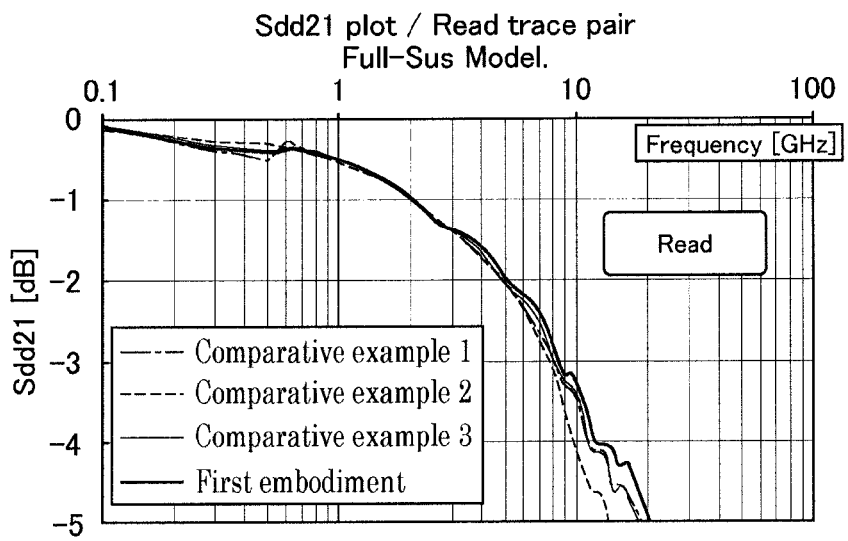
FIGS. 8A to 8C are graphs illustrating changes in SDD21 of wiring patterns according to the first embodiment and the comparative examples.
Figure 8B:
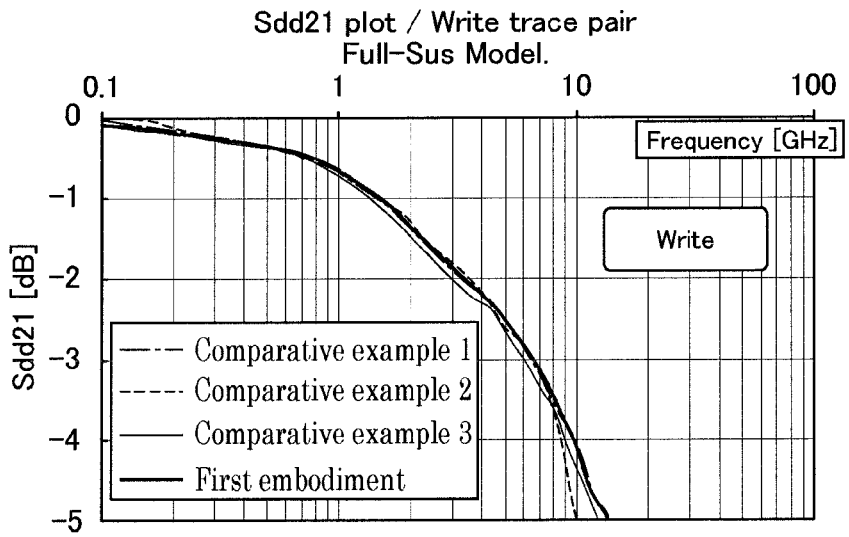
Figure 8C:
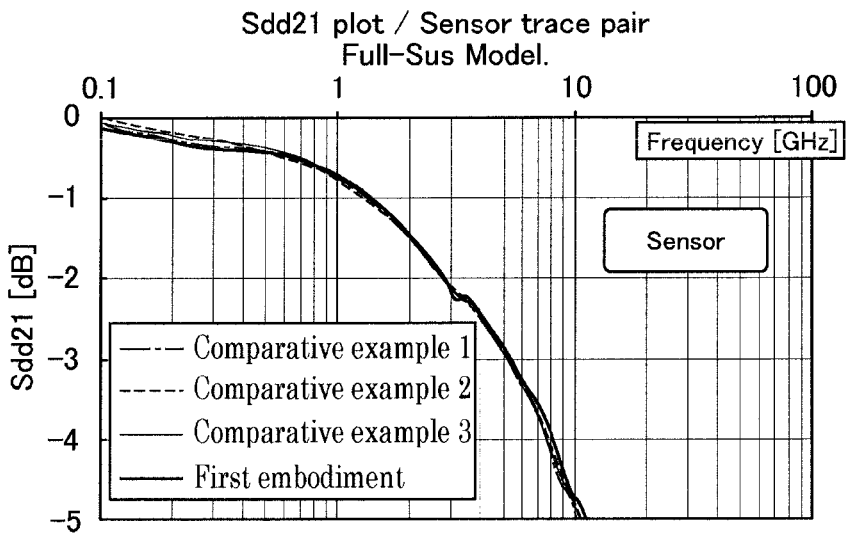

FIGS. 8A to 8C are graphs illustrating changes in SDD21 of wiring patterns according to the first embodiment and comparative examples in which FIGS. 8A, 8B and 8C are based on measured values of reading traces, writing traces and sensor traces. FIG. 9 is a table of the measured values of frequencies at "−3 dB" of FIGS. 8A to 8C.

In FIGS. 8A to 8C, an ordinate indicates SDD21 (dB) and an abscissa indicates frequency (GHz). In FIG. 9, "Read", "Write" and "Sensor" correspond to reading traces, writing traces and sensor traces, respectively.

As is apparent from FIGS. 5A to 9, the changes in SDD21 of the reading traces, writing traces and sensor traces according to the first embodiment exhibit values at "−3 dB" greater than those of the comparative examples 1 to 3, so that the first embodiment widens a signal bandwidth.

In this way, the first embodiment forms the isolated portions 29a to 29g electrically isolated from each other and from the substrate body 31 of the metal substrate 19, so that it widens the signal bandwidth while suppressing the variation of impedance (signal transmission).

The first embodiment provides following effects due to the features.

The flexure 7 has the metal substrate 19, the insulating layer 21 formed on the metal substrate 19, and the wiring pattern 23 arranged on the insulating layer 21 and having the first end connected to the slider 9 and the second end that is provided with the terminal 27a (27b to 27g) for external connection. The insulating layer 21 extends over the back of the terminal 27a and the surrounding portion of the back. The metal substrate 19 has the isolated portion 29a (29b to 29g) that is on the back of the terminal 27a through the insulating layer 21 and is separated and electrically isolated from the other portion of the metal substrate 19.

Therefore, the flexure 7 secures or improves strength of the terminal 27a with the insulating layer 21 and the isolated portion 29a of the metal substrate 19 while preventing the isolated portion 29a from deteriorating electric characteristic of the flexure 7.

Namely, the insulating layer 21 supports the terminal 27a from the back and the surrounding portion of the back and the isolated portion 29a supports the terminal 27a from the back through the insulating layer 21, to secure strength of the terminal 27a. As a result, the flexure 7 allows the terminal 27a to be handled by a jig from the back, to securely connect the terminal 27a of the flexure 7 to the terminal of the circuit board.

Even in this structure, the isolated portion 29a is electrically isolated from the other portion of the metal substrate 19, so that it prevents the isolated portion 29a from generating or increasing capacitance with respect to the corresponding terminal 27a. This suppresses variation of the signal transmission of the wiring pattern 23 such as a dip or partial depression and raise of impedance at the terminal 27a.

Since the terminal 27a is supported by the insulating layer 21 from the back and the surrounding area of the back, the flexure 7 surely improves the strength of the terminal 27a.

The isolated portion 29a has the planar shape that is larger than the terminal 27a capable of covering the terminal 27a entirely, so that the isolated portion 29a supports the terminal 27a from the back and the surrounding portion through the insulating layer 21. This further improves the strength of the terminal 27a.

According to the first embodiment, the wiring pattern 23 has the plural traces 25a to 25g for reading and writing data and the sensor and the terminals 27a to 27g of the traces 25a to 25g. The isolated portions 29a to 29g are provided for the terminals 27a to 27g, respectively.

Therefore, the flexure 7 improves the strength of the terminals 27a to 27g of all the traces 25a and 25g while preventing the isolated portions 29a to 29g from causing variation of the signal transmission of the wiring pattern 23 at the terminals 27a to 27g. This results in improving reliability of the signal transmission and the electrical connection of the flexure 7.

In addition, the variation of impedance on the reading traces is relatively small, so the isolated portions corresponding to the terminals of the reading traces may be connected to the substrate body 31 to form un-isolated portions.

The head suspension 1 with the flexure 7 includes the base plate 5 and the load beam 3 supported with the base plate 5 and the flexure 7 attached to the load beam 3.

Therefore, the head suspension 1 improves reliability so that it suppresses variation of the signal transmission of the wiring pattern 23 at the terminals 27a to 27g of the flexure 7.

The isolated portions 29a to 29g may be modified as illustrated in FIGS. 10 to 13. FIGS. 10 to 13 are bottom plan views illustrating terminal portions of flexures according to first to fourth modifications of the first embodiment, respectively. The modifications are basically the same as the first embodiment, and therefore, corresponding parts are represented with the same reference marks, or the same reference marks plus "A" to "D" in order to omit a repetition of explanation.

Figure 10:
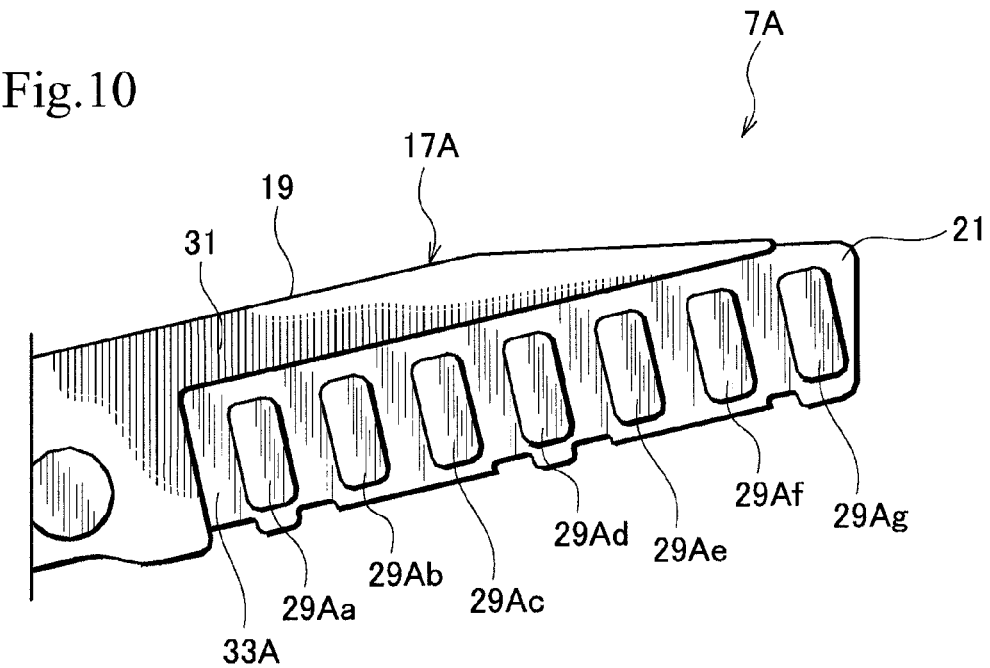
FIGS. 10 to 13 are bottom plan views each illustrating a terminal portion of a flexure according to a modification of the first embodiment.

According to the first modification of FIG. 10, isolated portions 29Aa to 29Ag each have a rectangular planar shape that is the same as the terminals 27A to 27g. In proportion as the planer shape of the isolated portions 29Aa to 29Ag, the groove 33A defined between adjacent isolated portions and between the isolated portions 29Aa to 29Ag and the substrate body 31 of the metal substrate 19 is greater than the groove 33 of the first embodiment.

Figure 11:
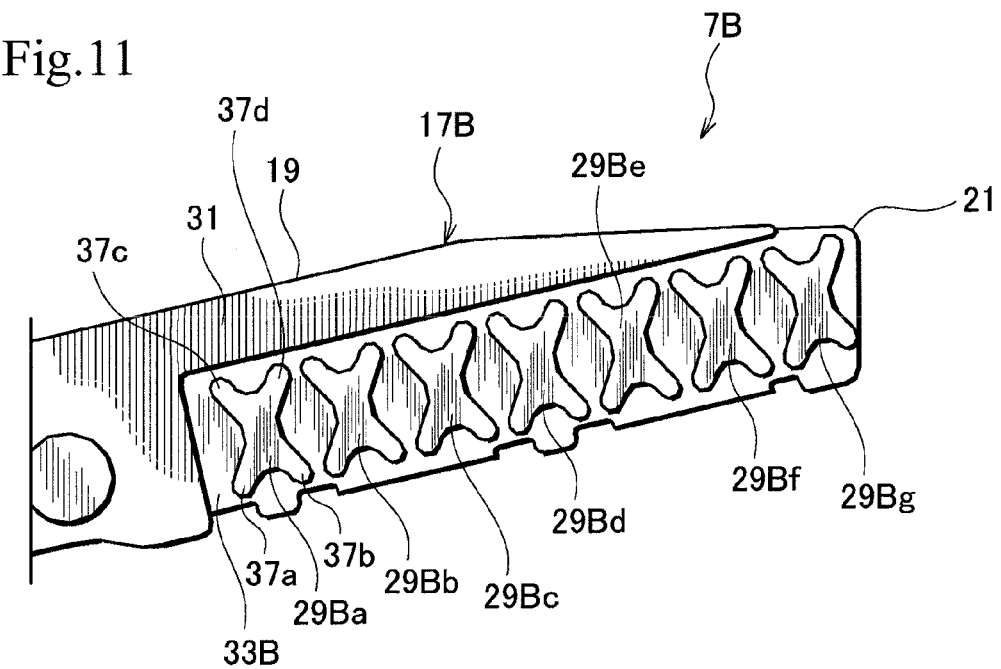

According to the second modification of FIG. 11, isolated portions 29Ba to 29Bg each have a decussate planer shape that covers the corresponding terminal with a central portion through an insulating layer 21. Each isolated portion has legs 37a to 37d radially outwardly extending from the central portion, in particular, each form a portion of the central portion corresponding to a corner of the corresponding terminal.

In proportion as the planer shape of the isolated portions 29Ba to 29Bg, the groove 33B is greater than the groove 33 of the first embodiment.

Figure 12:
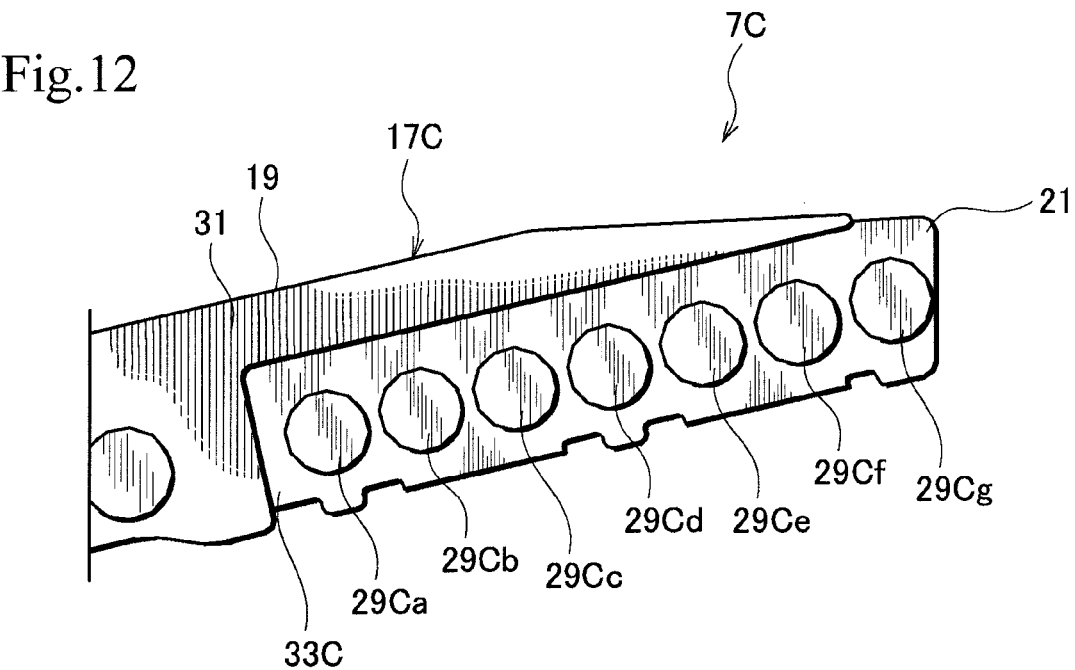

According to the third modification of FIG. 12, isolated portions 29Ca to 29Cg each have a circular planer shape that covers the corresponding terminal with a central portion through an insulating layer 21. The peripheral portion of each isolated portion protrudes from the corresponding terminal in a longitudinal direction of the flexure 7C. From each isolated portion, both ends of the corresponding terminal protrude in a lateral direction of the flexure 7C.

In proportion as the planer shape of the isolated portions 29Ca to 29Cg, the groove 33C is greater than the groove 33 of the first embodiment.

Figure 13:
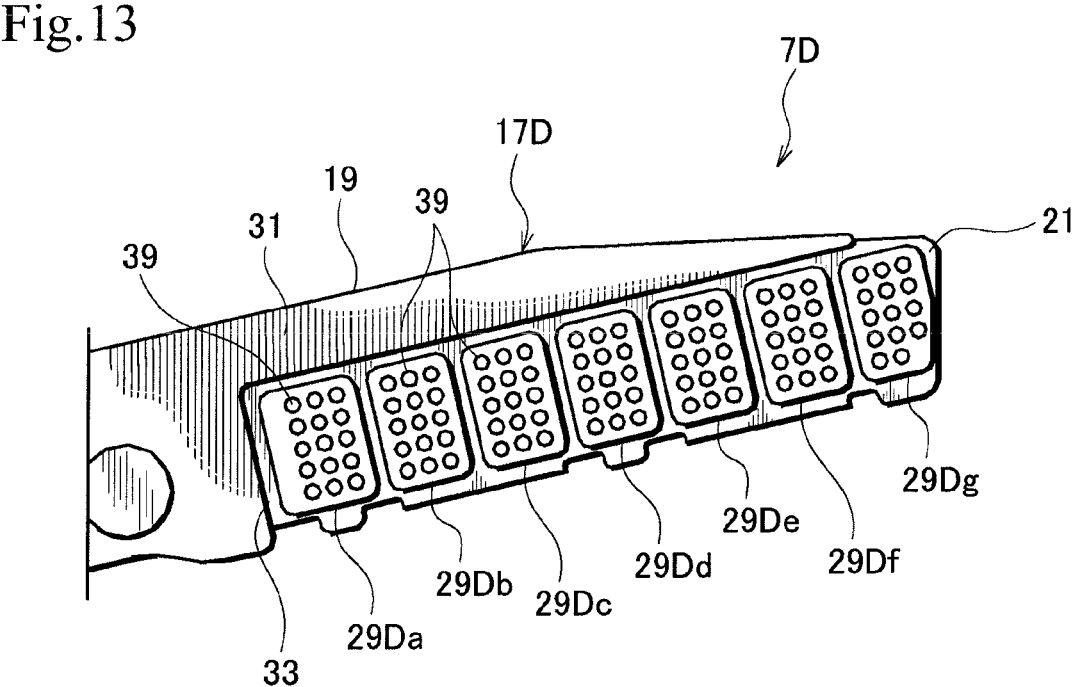

According to the fourth modification of FIG. 13, isolated portions 29Da to 29Dg each have a rectangular planar shape that is the same as that of the isolated portion of the first embodiment. Each isolated portion has plural through holes 39 formed therethrough. The through holes 39 expose an insulating layer 21 on the outside of the isolated portion.

The first and fourth modifications provide the same effects as the first embodiment.

Additionally, the fourth modification improves heat radiation performance with the through holes 39 from the back of each terminal.

The groove (33) may be changed in size according to shapes or sizes of isolated portions (29a to 29g) like the grooves 33A to 33C. The maximum size of the groove, i.e., the minimum size of the isolated portion is dependent on an unit or a jig for connecting a terminal (27a to 27g) of a flexure and a terminal of a circuit board.

Figure 14:
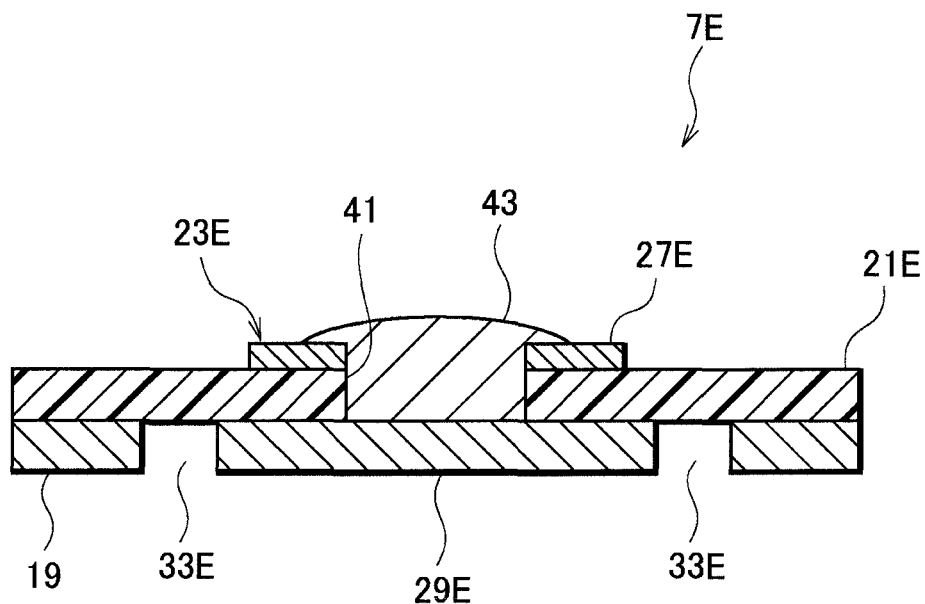
FIG. 14 is a sectional view illustrating a terminal of a flexure according to a second embodiment of the present invention.

A second embodiment of the present invention will be explained with reference to FIGS. 14 to 17. FIG. 14 is a sectional view illustrating a terminal of a flexure according to the second embodiment of the present invention. The second embodiment is basically the same as the first embodiment, and therefore, corresponding parts are represented with the same reference marks, or the same reference marks plus "E" to omit a repetition of explanation.

A flexure 7E has an isolated portion 29E electrically connected to a terminal 27 E. The isolated portion 29E is one of isolated portions 29Ea to 29Eg (not illustrated) and corresponds to the terminal 27E that is one of terminals 27Ea to 27Eg (not illustrated). Namely, the following is an explanation of the typical isolated portion 29E and the typical terminal 27E instead of the isolated portions 29Ea to 29Eg and the terminals 27Ea to 27Eg.

The flexure 7E has a passage 41 formed through an insulating layer 21E and the terminal 27E over the isolated portion 29E. The passage 41 is a hollow space closed at one end with the isolated portion 29E and opened at the other end on the surface of the terminal 27E. The passage 41 is filled with a conductive material such as conductive adhesive, silver paste or the like to form a connection 43.

The connection 43 is fixed to the surface of the isolated portion 29E at one end and is fixed to the terminal 27E at the other end in the passage 41. The other end of the connection 43 protrudes from the passage 41 and swells on the surface of the terminal 27E. The swelling has a hemispherical shape that radially outwardly expands along the surface of the terminal 27E with respect to the passage 41. The swelling is fixed to the surface of the terminal 27E.

With this structure, the isolated portion 29E is electrically connected to the terminal 27E with the connection 43 that passes through the passage 41.

In addition, the isolated portion 29E may have a planar shape that is the same as one of the first embodiment and modifications illustrated in FIGS. 10 to 13.

Figure 15A:
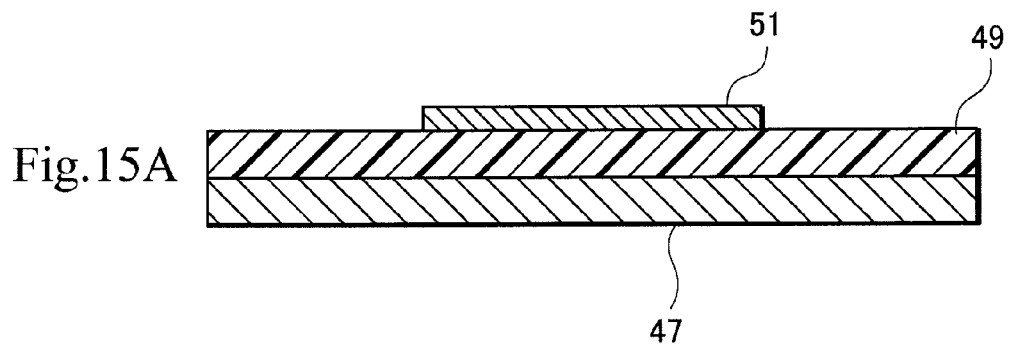
FIGS. 15A to 15C are sectional views illustrating steps of constructing a structure around the terminal of FIG. 14.
Figure 15B:
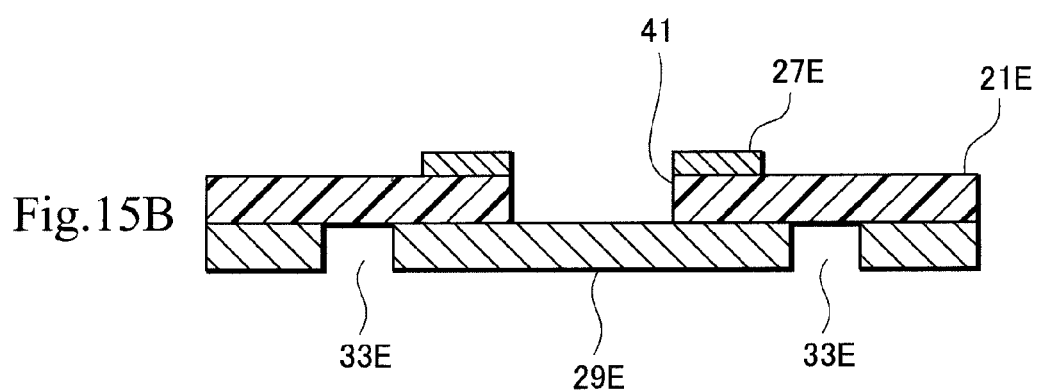
Figure 15C:
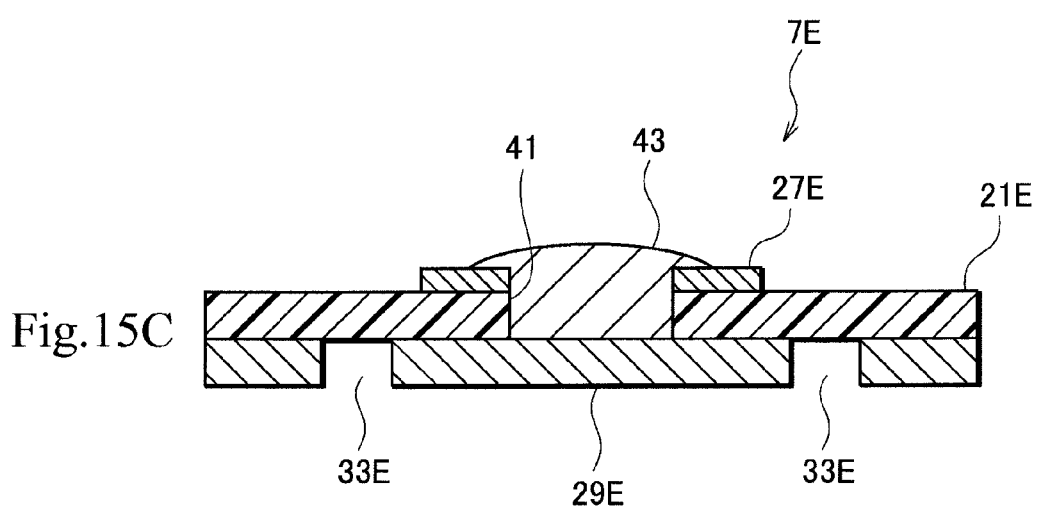

FIGS. 15A to 15C are sectional views illustrating steps of constructing the structure around the terminal of FIG. 14, i.e., the terminal, the isolated portion and the connection.

As illustrated in FIG. 15A, when constructing the structure around the terminal 27E of the flexure 7E, a semi-finished flexure is prepared so that a semi-finished insulating layer 49 and semi-finished terminal 51 are layered on the semi-finished metal substrate 47 in advance.

The semi-finished insulating layer 49 is formed by applying thermosetting or photosensitive resin on the semi-finished metal substrate 47 and heating the applied resin or irradiating the applied resin with ultraviolet. The semi-finished terminal 51 is formed on the semi-finished insulating layer 49 by plating with conductive material such as copper.

After that, the passage 41 and a groove 33E are formed on the semi-finished flexure as illustrated in FIG. 15B. The passage 41 is shaped by partly removing or etching the semi-finished terminal 51 and semi-finished insulating layer 49. Similarly, the groove 33E is shaped by partly removing or etching the semi-finished metal substrate 47.

Therefore, the semi-finished flexure is provided with the finished terminal 27E and the finished insulating layer 21E with the passage 41 and the isolated portion 29E.

After that, the passage 41 is filled with a liquid conductive material as illustrated in FIG. 15C. The filling is carried out so that the conductive material overflows from the passage 41 to radially outwardly spread along the surface of the terminal 27E. Then, the conductive material is solidified to form the connection 43 electrically connecting between the isolated portion 29E and the terminal 27E through the passage 41.

According to the second embodiment, it provides the same effects as the first embodiment.

Furthermore, the second embodiment has the passage 41 formed through the insulating layer 21E and the terminal 27E over the isolated portion 29E, and the connection 43 passing through the passage 41 and electrically connecting the isolated portion 29E and the terminal 27E. This prevents the isolated portion 29E from charging static electricity.

The connection 43 is the conductive material filling the passage 41, so that the connection 43 secures the electric connection between the isolated portion 29E and the terminal 27E to surely prevent the isolated portion 29E from charging static electricity.

Furthermore, the flexure 7E enables to conduct electric measurement with probes through the terminal 27E and isolated portion 29E from both sides. This results in increasing degree of freedom in a measuring unit and reducing damage to the terminal 27E at the time of the measurement.

Figure 16:
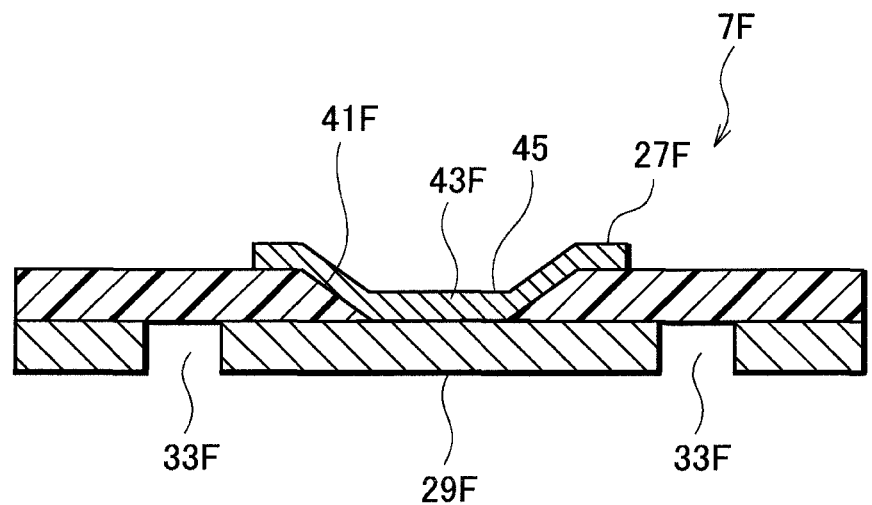
FIG. 16 is a sectional view illustrating a terminal of a flexure according to a modification of the second embodiment.

The connection may be modified as illustrated in FIG. 16. FIG. 16 is a sectional view illustrating a terminal of a flexure according to the modification of the second embodiment. The modification is basically the same as the second embodiment, and therefore, corresponding parts are represented with the same reference marks, or the same reference marks plus "F" in order to omit a repetition of explanation.

According to the modification, the flexure 7F has a connection 43F integrated with and extending from a terminal 27F.

The passage 41F is formed through an insulating layer 21F and has a sectional shape that gradually narrows toward an isolated portion 29F. The connection 43F is positioned within the passage 41F.

The connection 43F is formed by bending a central portion of the terminal 27F along an inner surface in the passage 41F, i.e., an inner circumference of the passage 41F and a surface of the isolated portion 29F that faces the passage 41F. The connection 43F is fixed to the inner surface in the passage 41F. Therefore, the terminal 27F and the isolated portion 29F are electrically connected together through the connection 43F. In addition, the terminal 27F has a recess 45 due to the bent shape of the connection 43F.

Figure 17A:
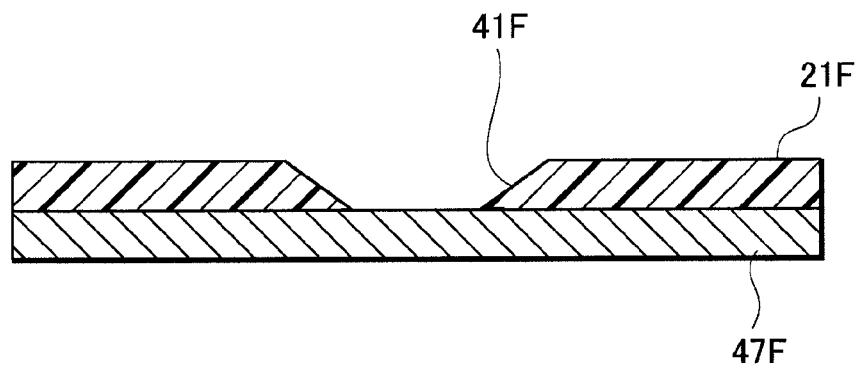
FIGS. 17A to 17C are sectional views illustrating steps of constructing a structure around the terminal of FIG. 16.
Figure 17B:
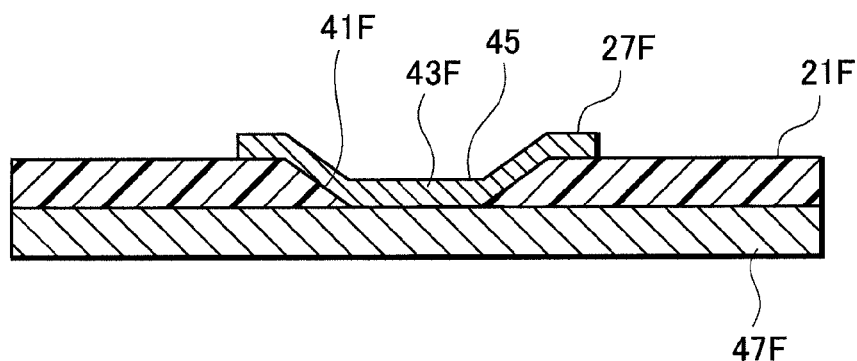
Figure 17C:
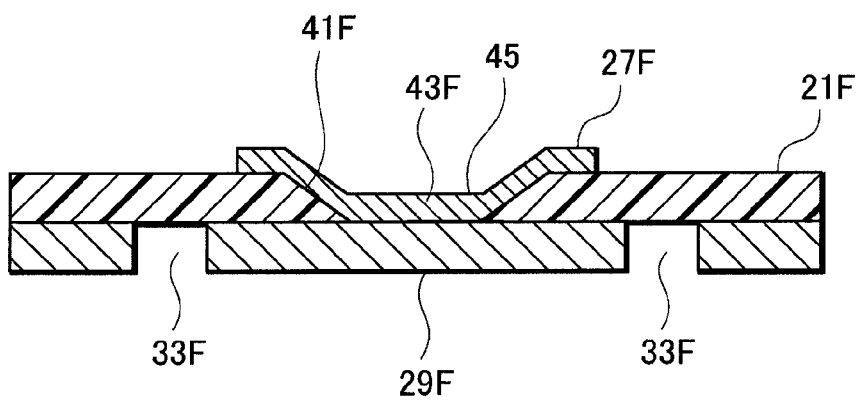

FIGS. 17A to 17C are sectional views illustrating steps of constructing the structure around the terminal of FIG. 16, i.e., the terminal, the isolated portion and the connection.

As illustrated in FIG. 17A, when constructing the structure around the terminal 27F of the flexure 7F, the insulating layer 21F with the passage 41F is layered on a semi-finished metal substrate 47F. The insulating layer 21F with the passage 41F is formed by applying photosensitive resin on the semi-finished metal substrate 47F and irradiating the applied resin with ultraviolet through a gradation mask.

After that, the terminal 27F is layered on the insulating layer 21F as illustrated in FIG. 17B. Namely, the terminal 27F is formed by plating the insulating layer 21F including the passage 41F with conductive material such as copper. Therefore, the terminal 27F is integrally provided with the connection 43F along the inner surface in the passage 41F.

After that, the groove 33F is formed as illustrated in FIG. 17C. Namely, the groove 33F is shaped by partly removing or etching the semi-finished metal substrate 47F.

Therefore, the flexure 7F is provided with the isolated portion 29F that is electrically connected to the terminal 27F with the connection 43F through the passage 41F.

According to the modification, it provides the same effects as the second embodiment.

Furthermore, the modification uses the isolated portion 29F for electric power feeding to form a wiring pattern 23 by electroplating. As a result, the modification can omit wirings adjacent to the terminal 27 F for electroplating that are unnecessary for the finished flexure 7F. This improves electric characteristic of the flexure 7F while forming the wiring pattern 23 by electroplating.

What is claimed is:

1. A flexure supporting a head to read and write data, comprising:
   a metal substrate;
   an insulating layer formed on the metal substrate;
   a wiring pattern arranged on the insulating layer and having a first end connected to the head and a second end that is provided with a terminal for external connection;
   the insulating layer extending over a back of the terminal and a surrounding portion of the back; and
   the metal substrate having an isolated portion that is on the back of the terminal through the insulating layer and is separated and electrically isolated from the other portion of the metal substrate: and
   wherein the metal substrate has a substrate body, on a back surface of the insulating layer onto which the metal substrate is disposed, being positioned on one side of the isolated portion in a lateral direction crossing a longitudinal direction and a layer direction of the flexure, whereas the substrate body is not positioned on another side of the isolated portion in said lateral direction;
   wherein the substrate body that is positioned on said one side of the isolated portion extends in the longitudinal direction so as to cover a first edge of the insulating layer in said lateral direction from a back side and have a substrate edge facing the isolated portion in said lateral direction;
   wherein a second edge of the insulating layer opposite to the first edge in said lateral direction exposes to the outside from the back side; and
   wherein the isolated portion is interposed between the substrate edge of the substrate body and the second edge of the insulating layer in said lateral direction.

2. The flexure of claim 1 wherein the isolated portion has a planar shape so as to cover the terminal entirely.

3. The flexure of claim 2 wherein the isolated portion has a planar shape larger than the terminal.

4. The flexure of claim 1 wherein the isolated portion is rectangular, decussate or circular in a planar shape.

5. The flexure of claim 1, further comprising:
   a through hole formed through the isolated portion.

6. The flexure of claim 1 wherein the isolated portion is separated from the other portion with a gap of at least 70 μm.

7. The flexure of claim 1, further comprising:
   a passage formed through the insulating layer over the isolated portion;
   a connection passing through the passage and electrically connecting the isolated portion and the terminal.

8. The flexure of claim 7 wherein the passage is formed through the terminal along with the insulating layer and the connection is formed from a conductive material filling the passage.

9. The flexure of claim 7 wherein the connection is integrated with and extends from the terminal.

10. The flexure of claim 1 wherein the wiring pattern includes plural traces each having the terminal and the isolated portion is formed on the back of each terminal through the insulating layer.

11. A head suspension with the flexure of claim 1, comprising:
   a base plate and a load beam supported with the base plate;
   the flexure attached to the load beam.

* * * * *